United States Patent [19]

Blucher et al.

[11] 4,127,045
[45] Nov. 28, 1978

[54] BAND SAW MACHINE

[75] Inventors: Joseph T. Blucher, Waltham; Stephen R. Crosby, Sterling Junction; Dennis W. Stephens, Ashburnham, all of Mass.

[73] Assignee: Wallace Murray Corporation, Fitchburg, Mass.

[21] Appl. No.: 857,809

[22] Filed: Dec. 5, 1977

Related U.S. Application Data

[63] Continuation of Ser. No. 774,761, Mar. 7, 1977, abandoned.

[51] Int. Cl.² .......................... B23D 55/08; B26D 1/46
[52] U.S. Cl. .......................................... 83/796; 83/801; 83/820
[58] Field of Search ................. 83/801, 794, 820, 759, 83/490

[56] References Cited

U.S. PATENT DOCUMENTS

| | | | |
|---|---|---|---|
| 3,077,132 | 2/1963 | Whitmore | 83/801 X |
| 3,656,261 | 4/1972 | Everett | 83/490 X |
| 3,715,946 | 2/1973 | Kaltenbach | 83/490 X |
| 3,752,022 | 8/1973 | Demurger | 83/801 X |
| 3,941,022 | 3/1976 | Sato et al. | 83/801 X |
| 4,023,448 | 5/1977 | Bertini | 83/661 X |

Primary Examiner—Willie G. Abercrombie

[57] ABSTRACT

A band saw machine is provided with a guide for the blade which repeatedly moves the cutting reach of the blade laterally of its longitudinal axis and in the plane of the reach while the blade is advancing longitudinally to provide greatly improved sawing speed.

12 Claims, 5 Drawing Figures

BAND SAW MACHINE

This is a continuation of application Ser. No. 774,761, filed Mar. 7, 1977, now abandoned.

This invention relates to a band saw machine and pertains more specifically to an improved machine having higher cutting speed than a conventional machine.

Conventional band saw machines have a table for supporting the article or workpiece to be sawed, and a frame in which an endless band saw blade is mounted, the saw blade being trained around a pair of pulleys or sheaves to provide a pair of reaches of saw blade between the pulleys, one reach doing the sawing or cutting (called the cutting reach) and the other being idle (called the return reach), and a drive for one or both pulleys to advance the cutting reach longitudinally in the direction of its axis. In some cases the frame of the machine is pivotally mounted on the table so that the two can be moved toward each other; in this case a load can be applied to the cutting reach of the blade either by gravity or by a hydraulic cylinder or by any other suitable mechanism so that the toothed edge of the blade is continually urged against the workpiece supported by the table during the sawing operation.

It has previously been proposed in Maderspach German Pat. No. 2,875 (1878) to provide a band saw blade in which sections of the cutting teeth of the blade are positioned so that their tips lie in sloping line with respect to the longitudinal axis of the blade in order to reduce the load on the blade and decrease power consumption, and it has been found that such blades provide higher cutting speeds.

It has now been found that markedly faster cutting of the workpiece can be achieved by providing means for repeatedly or cyclically moving the cutting reach of the blade and the supporting table towards each other in a direction transverse to the longitudinal axis of the cutting reach and in the place of the reach while the latter is being advanced longitudinally in the direction of its axis. The frequency of the repeated transverse movement can be varied over a wide range from once during the time period required for the entire length of the blade to pass a given point (i.e., a single circuit or passage of the blade around its pulleys) to as many as ten times during such a circuit at the usual range of speeds of operation of band saws, i.e., from 50 to 300 feet per minute. The amplitude of the movement can also be varied over a considerable range, from about 10 to about 200 mils at the point of greatest movement. The repeated distortion or flexing of the blade to the extent stated can readily be achieved since the length of the cutting reach is usually from 10 to 50 inches. This rapid and repeated or cyclical movement of the cutting reach causes to be superimposed on the usual continuous load on the cutting reach of the blade an additional, rapidly varying load measured transversely of the longitudinal axis of the blade as well as an additional, rapidly varying drag measured parallel to the longitudinal axis of the blade. It also causes the individual teeth to be presented to the workpiece in a manner varying with the transverse displacement of the blade. The substantial increase in speed of sawing can be demonstrated by a directed comparison between two identical band saw machines using identical saw blades and operated under identical conditions except for the provision in one of them for repeated transverse or lateral movement of the cutting reach; the increase in cutting speed ranges up to 5% and even more depending on the nature of the material being sawed.

The following embodiments are intended to illustrate the invention more fully without acting as a limitation upon its scope.

Figure 1:
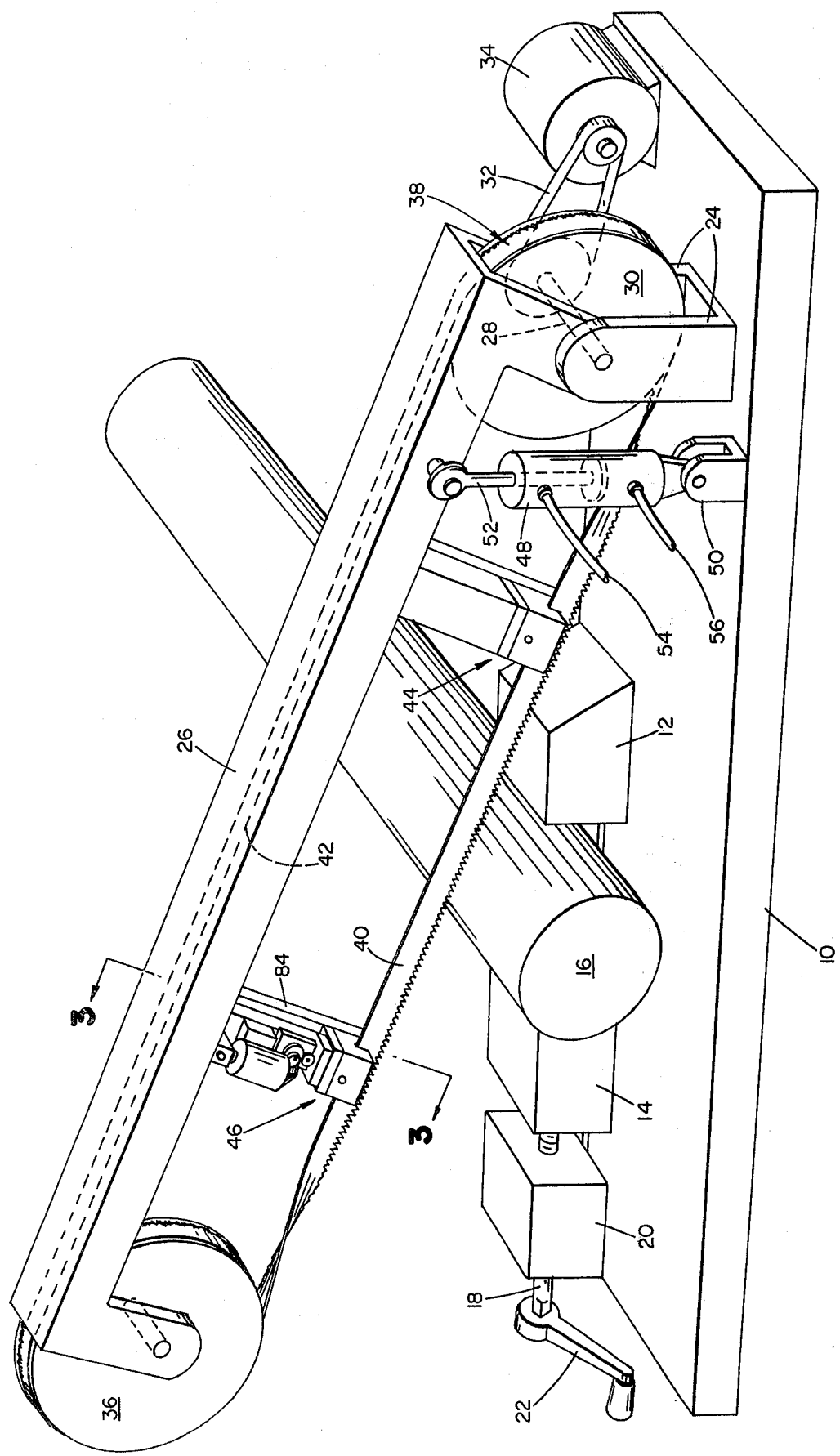
FIG. 1 is an isometric view showing one embodiment of the present invention.

In the drawing, the machine as illustrated includes a table 10 having a pair of clamps 12, 14 for gripping and supporting in sawing position article or workpiece 16 which is to be cut by the saw. Clamp 12 is fixed to the table while clamp 14 is slidably mounted thereon being movable to any desired location by threaded shaft 18 which threadedly engages bracket 20 and which is provided with crank handle 22 at its free end.

Adjacent one end of table 10 and fixed to it is a pair of upstanding brackets 24 on which frame 26 is pivotally mounted by means of shaft or pin 28. Also mounted on shaft 28 is pulley 30 which is driven by a conventional belt drive 32 from motor 34. An idler pulley 36 is mounted at the opposite end of frame 26 and an endless band saw blade 38 of any conventional construction is trained about the pulleys. Generally, such blades are constructed so that corresponding portions of corresponding successive teeth all lie in a straight line parallel to the longitudinal axis of the blade, and the rear non-cutting edge is smooth and straight. The lower reach 40 of the blade extending between the pulleys is the portion which does the sawing of workpiece 16 and is hereinafter called the cutting reach. The return reach 42 is idle.

In the embodiment shown, the cutting reach extends generally horizontally above the table and workpiece as the sawing progresses and is twisted through 90° as it leaves one pulley, then twisted back again as it approaches the other so that cutting reach 40 lies in the same plane as the plane of rotation through which frame 26 moves. The saw blade is maintained in its twisted condition by a pair of spaced apart saw guides 44, 46 mounted on frame 26. In the embodiment shown, cutting reach 40 is loaded by the weight of frame 26, the load being applied transversely along the longitudinal axis of the reach toward the table 10 while reach 40 is being advanced longitudinally along its axis from one pulley to the other. When additional loading is desired, or if it is desired to change the positioning of the saw machine so that the weight of frame 26 no longer suffices to apply the desired load, a double acting hydraulic cylinder 48 can be provided having its lower end secured to table 10 by bracket 50 fixed to the table while the end of piston 52 mounted for reciprocation in the cylinder is secured to frame 26. By applying pressure to the cylinder at one side of piston 52 through tubing 54 while venting the other end of the cylinder through tubing 56, frame 26 and table 10 are continuously urged toward each other to load cutting reach 40 transversely of its longitudinal axis and in the plane of the reach toward the table while it is simultaneously being advanced longitudinally along its axis about the pulleys.

Saw guide 46, as best appears in FIGS. 2–5, includes a member 58 having a slot in its lower face for receiving and guiding reach 40 of the saw blade. Member 58 is secured at its upper end to follower 60 by means of locating pins 62, 62 and bolt 64. An adjustment screw 66 in the side of member 58 provides for adjusting the width of the blade-receiving slot to accommodate blades of varying gauge. Bearing element 68 is rotatably mounted on thrust bearing 70 to provide a surface bearing against the rear edge 72 of the blade reach 40 opposite its toothed cutting edge. Fitting 74 is provided through which a supply of conventional lubricant is conducted through passage 76 to bearing element 68.

Follower 60 is mounted for vertical sliding movement in a direction transverse to the longitudinal axis of cutting reach 40 and is provided with guide pins 78, 78 fixed to it and extending through mating holes in blocks 80, 80 which in turn are welded to support member 82 fixed to arm 84 forming a part of frame 26 and extending downwardly therefrom. Follower 60 includes a second surface in the form of a rotatably mounted cam follower bearing surface 86.

Figure 2:
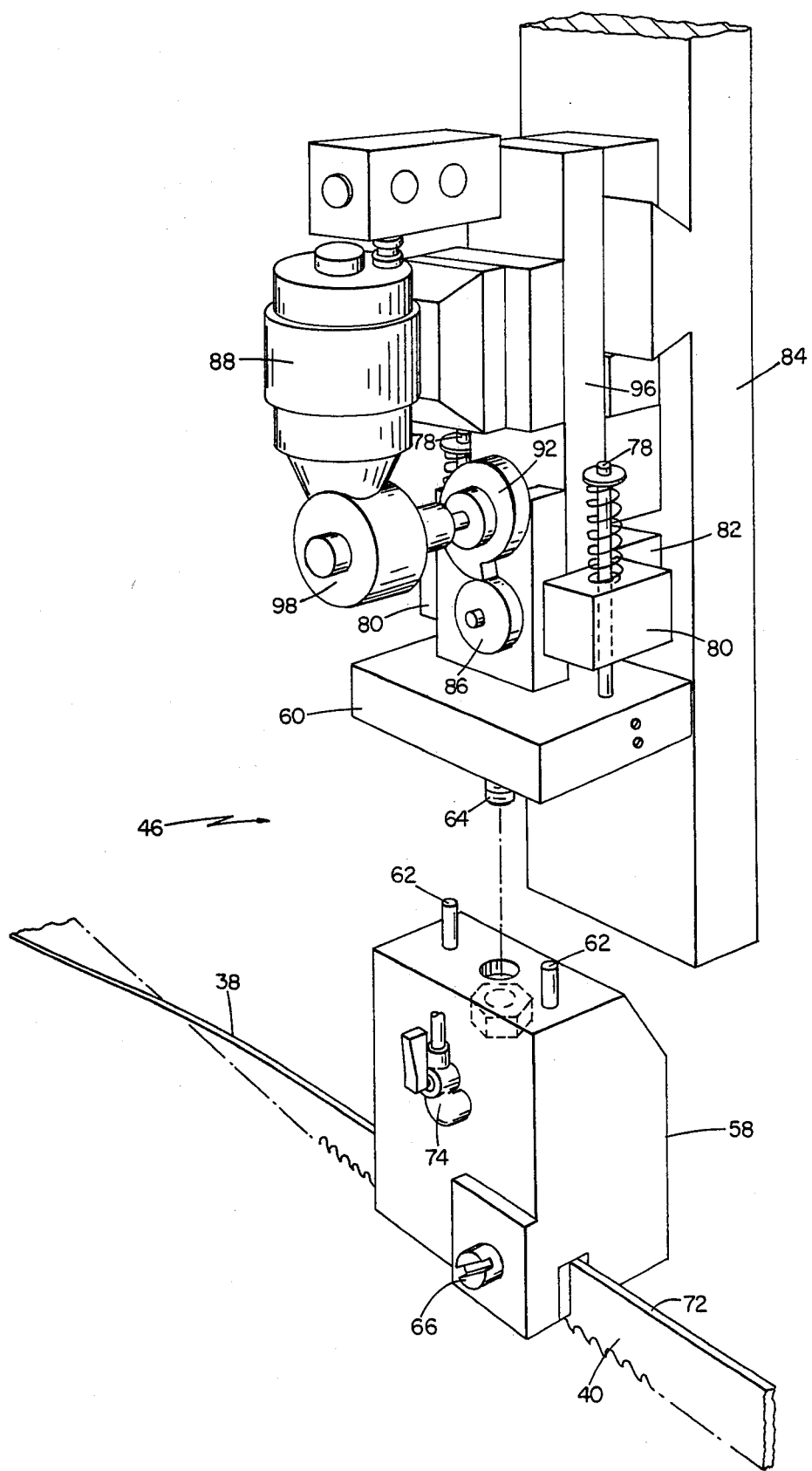
FIG. 2 is an isometric view on an enlarged scale partly broken away and with parts separated from each other showing the device for repeatedly or cyclically moving the blade.
Figure 3:
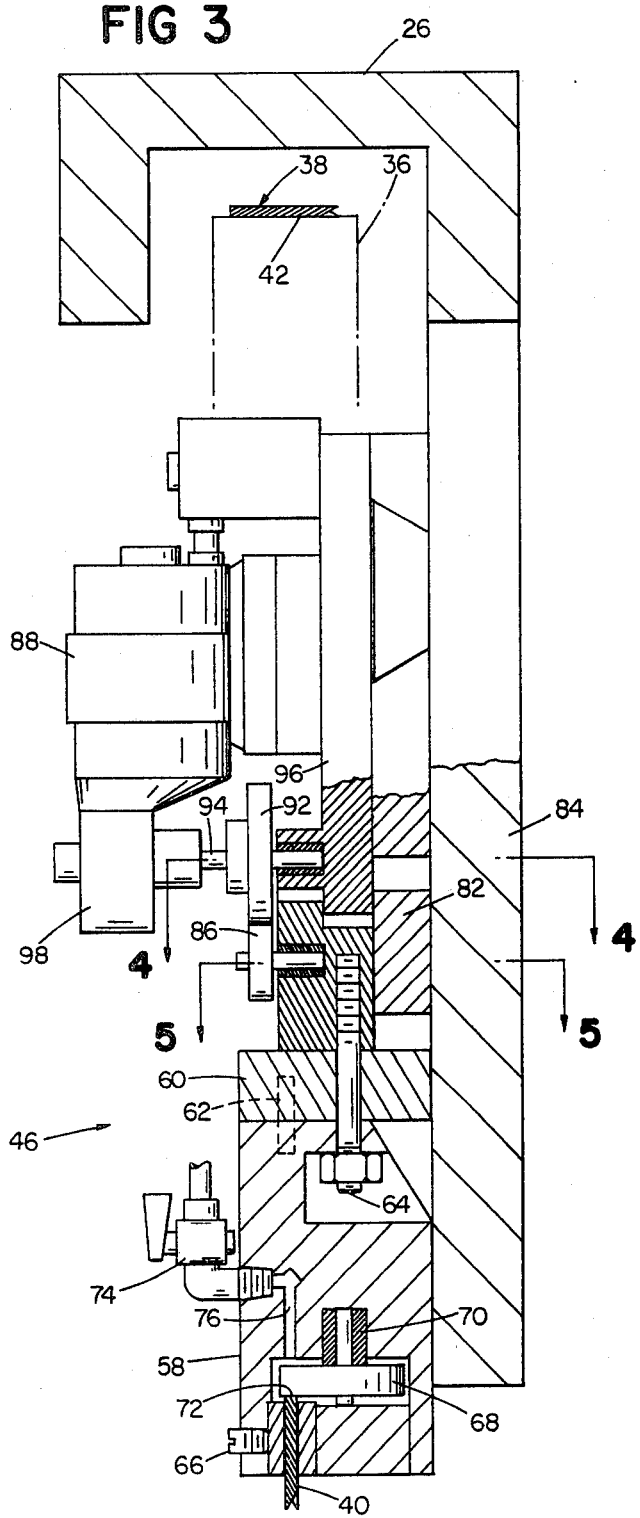
FIG. 3 is a view in vertical section partly broken away taken along line 3—3 of FIG. 1.
Figure 4:
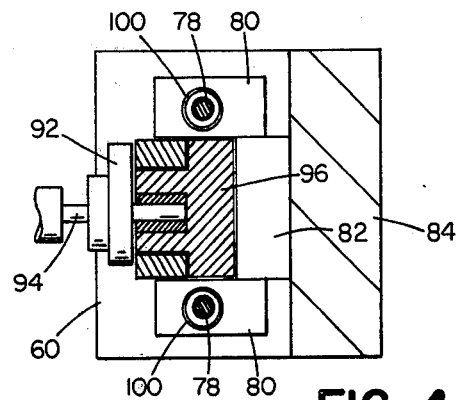
FIG. 4 is a view in section taken along line 4—4 of FIG. 3.
Figure 5:
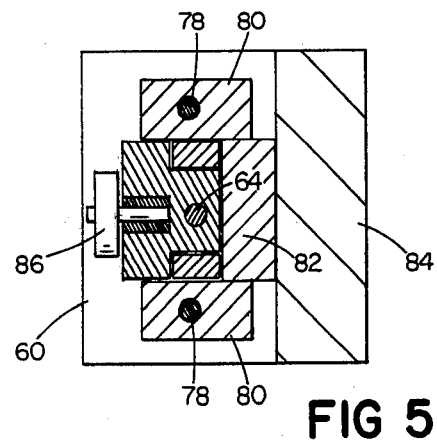
FIG. 5 is a view in section taken along line 5—5 of FIG. 3.

Mounted in fixed position on arm 84 above saw guide 46 is a cam drive mechanism including electric motor 88 provided with suitable controls 90. Rotary step cam 92 is keyed to drive shaft 94 journalled at one end in backing element 96 which is secured to arm 84 and which also supports motor 88. Shaft 94 is driven from motor 88 through a suitable gear box 98, so that cam 92 is driven in a clockwise direction as seen in FIG. 2.

When assembled for operation, the guide pins 78, 78 extend slidably through blocks 80, 80 and are provided with compression springs 100, 100 to urge follower 60 together with member 58 yieldingly upwardly so that its second surface, the cylindrical cam follower bearing surface 86, is maintained in contact with rotary step cam 92.

In operation of the machine, the saw blade 38 on pulley 30 is driven from the motor 34 in the usual manner to advance cutting reach 40 in the frame longitudinally in the direction of its axis, and rotary step cam 92 is independently driven from motor 88 at any desired speed, causing follower 60 and associated member 58 which together form saw guide 46 to move cutting reach 40 repeatedly or cyclically toward supporting table 10 on which workpiece 16 is clamped. Frame 26 is pivoted downwardly until cutting reach 40 comes in contact with the workpiece and a load is continuously applied either by the weight of frame 26 or by actuation of hydraulic cylinder 48 in the usual manner, the cutting reach of the blade being loaded transversely of its longitudinal axis and in the plane of the reach toward the table 10 while it being advanced longitudinally by motor 34 and pulley 30. When the cut has been completed frame 26 may be raised by reversing the flow of fluid in cylinder 48 so that it enters through tubing 56 and is vented through tubing 54.

When employing a commercially available band saw blade one inch wide by 0.035 inch thick having pitched to center teeth spaced four per inch operating at a linear speed of the cutting reach of 125 ft/min. and a load of 120 lb., the band saw machine required 6.2 minutes to sever a stainless steel workpiece (annealed AISI 304) when the rotary cam was not actuated; when a step cam was provided having a single step of 0.065 inch which was driven at 240 r.p.m., the time required to sever the same workpiece was only 5.85 minutes.

What is claimed is:

1. A band saw machine having a table for supporting in sawing position an article to be sawed, a frame, an endless saw blade mounted on said frame to provide a cutting reach adjacent said sawing position and a return reach, and means for advancing said cutting reach in said frame longitudinally in the direction of its axis,
   wherein the improvement comprises means for repeatedly moving said cutting reach and said supporting table toward each other in a direction transverse to the longitudinal axis of the reach and in the plane of the reach while said cutting reach is being advanced longitudinally.

2. A band saw machine as claimed in claim 1 in which said frame is mounted with said cutting reach extending generally horizontally above said table.

3. A band saw machine as claimed in claim 2 in which said frame is pivotally mounted with said cutting reach above said table to permit the weight of said frame to load said cutting reach transversely of its longitudinal axis toward said table while said cutting reach is being advanced longitudinally.

4. A band saw machine as claimed in claim 1 in which said frame and said table are mounted for movement toward and away from each other, and including means for continuously urging said frame and said table toward each other to load said cutting reach transversely of its longitudinal axis toward said table while said reach is being advanced longitudinally.

5. A band saw machine as claimed in claim 3 in which said means for repeatedly moving said sawing reach includes a rotary step cam and means for rotating said cam.

6. A band saw machine as claimed in claim 4 in which said means for repeatedly moving said sawing reach includes a rotary step cam and means for rotating said cam.

7. A band saw machine as claimed in claim 5 in which said means is mounted on said frame and includes a saw guide for said cutting reach, said saw guide having a surface bearing against the rear edge of said blade opposite the cutting edge, having a second surface bearing against said cam, and being mounted for sliding movement in a direction transverse to the longitudinal axis of said sawing reach in position to follow said step cam.

8. A band saw machine as claimed in claim 6 in which said means is mounted on said frame and includes a saw guide for said sawing reach, said saw guide having a surface bearing against the rear edge of said blade opposite the cutting edge and having a second surface bearing against said cam, and being mounted for sliding movement in a direction transverse to the longitudinal axis of said cutting reach in position to follow said step cam.

9. A band saw machine as claimed in claim 7 including means for urging said saw guide second surface yieldingly against said cam.

10. A band saw machine as claimed in claim 8 including means for urging said saw guide second surface yieldingly against said cam.

11. A band saw machine as claimed in claim 3 in which a hydraulic cylinder is connected between said frame and said table to assist in loading said cutting reach.

12. A band saw machine as claimed in claim 4 in which said means for continuously urging said frame and said table toward each other comprises a hydraulic cylinder connected between said frame and said table.

* * * * *

UNITED STATES PATENT AND TRADEMARK OFFICE
CERTIFICATE OF CORRECTION

PATENT NO. : 4,127,045
DATED : November 28, 1978
INVENTOR(S) : Joseph T. Blucher et al.

It is certified that error appears in the above–identified patent and that said Letters Patent are hereby corrected as shown below:

Column 4, line 5, "saving" should be --sawing--.

Signed and Sealed this

Twenty-sixth Day of February 1980

[SEAL]

Attest:

SIDNEY A. DIAMOND

*Attesting Officer*     *Commissioner of Patents and Trademarks*